United States Patent
Oh et al.

(10) Patent No.: US 11,702,027 B2
(45) Date of Patent: Jul. 18, 2023

(54) TEAR INDUCING APPARATUS FOR PAB DOOR AND MANUFACTURING METHOD THEREOF

(71) Applicant: HYUNDAI MOBIS Co., Ltd., Seoul (KR)

(72) Inventors: Young Ki Oh, Yongin-si (KR); Seong Cheon Cho, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 17/361,656

(22) Filed: Jun. 29, 2021

(65) Prior Publication Data
US 2022/0234536 A1    Jul. 28, 2022

(30) Foreign Application Priority Data
Jan. 25, 2021 (KR) .......................... 10-2021-0010414

(51) Int. Cl.
*B60R 21/2165* (2011.01)
*B60R 21/215* (2011.01)
*B60R 21/205* (2011.01)

(52) U.S. Cl.
CPC ...................... *B60R 21/2165* (2013.01); *B60R 2021/21506* (2013.01)

(58) Field of Classification Search
CPC . B60R 21/205; B60R 21/215; B60R 21/2165; B60R 2021/21506
See application file for complete search history.

(56) References Cited

U.S. PATENT DOCUMENTS

| 4,989,896 | A | * | 2/1991 | DiSalvo | B60R 21/2165 280/732 |
| 5,082,310 | A | * | 1/1992 | Bauer | B60R 21/2165 280/732 |
| 6,612,607 | B1 | * | 9/2003 | Takahashi | B60R 21/2171 280/732 |
| 6,955,376 | B1 | * | 10/2005 | Labrie | B29C 45/1704 280/732 |
| 8,474,861 | B1 | | 7/2013 | Twork | |
| 10,377,336 | B2 | * | 8/2019 | Lu | B60R 21/2171 |
| 2001/0040367 | A1 | * | 11/2001 | Nakashima | B60R 21/2165 280/743.1 |

(Continued)

FOREIGN PATENT DOCUMENTS

| DE | 102009034923 A1 | * | 3/2011 | ........... B60R 21/205 |
| JP | 2006-232096 A | | 9/2006 | |

(Continued)

*Primary Examiner* — Barry Gooden, Jr.
(74) *Attorney, Agent, or Firm* — Morgan, Lewis & Bockius LLP (57) ABSTRACT

Conventional tear inducing ribs are replaced with pockets so that a contact area is increased so as to stably induce a tear of a scoring line. According to the present invention, a tear inducing apparatus for a passenger airbag (PAB) door includes a scoring line disposed on the PAB door and configured to be opened when an airbag cushion deploys, and a plurality of tear inducing pockets disposed on both sides of the scoring line to face each other and arranged in a longitudinal direction of the scoring line. Each of the plurality of pockets includes an empty inner space and a ridge including a flat portion positioned toward the airbag cushion.

20 Claims, 8 Drawing Sheets

(56) References Cited

U.S. PATENT DOCUMENTS

| | | | | |
|---|---|---|---|---|
| 2002/0149182 | A1* | 10/2002 | Yasuda | B60R 21/217 280/732 |
| 2007/0108741 | A1* | 5/2007 | Yasuda | B29C 66/54 280/728.3 |
| 2010/0078920 | A1* | 4/2010 | Terai | B60R 21/215 280/728.3 |
| 2011/0018241 | A1* | 1/2011 | Wagner | B60R 21/2165 280/728.3 |
| 2014/0167396 | A1* | 6/2014 | Webber | B60R 21/2155 280/743.1 |
| 2014/0375025 | A1* | 12/2014 | Pauthier | B60R 21/216 156/245 |
| 2016/0075301 | A1* | 3/2016 | Kwasnik | B60R 21/205 280/728.3 |
| 2019/0100164 | A1* | 4/2019 | Citko | B60R 21/2171 |
| 2019/0143929 | A1* | 5/2019 | Lu | B60R 21/2165 280/728.3 |
| 2019/0329727 | A1* | 10/2019 | Onorato Estevez | B60R 21/2334 |
| 2020/0238940 | A1* | 7/2020 | Swiniarski | B60R 21/2165 |
| 2020/0290550 | A1* | 9/2020 | Kokubu | B60R 21/215 |
| 2020/0307487 | A1* | 10/2020 | Sherman | B60R 21/215 |
| 2021/0101555 | A1* | 4/2021 | Schorn | B60R 21/205 |

FOREIGN PATENT DOCUMENTS

| | | |
|---|---|---|
| JP | 2007-137239 A | 6/2007 |
| JP | 5611619 B2 | 10/2014 |
| KR | 10-0307105 B1 | 11/2001 |
| KR | 10-0482422 B1 | 4/2005 |
| KR | 10-0803065 B1 | 2/2008 |

\* cited by examiner

FIG. 15

TEAR INDUCING APPARATUS FOR PAB DOOR AND MANUFACTURING METHOD THEREOF

CROSS-REFERENCE TO RELATED APPLICATION

This application claims priority to and the benefit of Korean Patent Application No. 10-2021-0010414 filed on 25 Jan. 2021, the disclosure of which is incorporated herein by reference in its entirety.

BACKGROUND

1. Field of the Invention

The present invention relates to a passenger airbag (PAB), and more particularly, to an apparatus for inducing tearing of a PAB door when an airbag deploys and to a method of manufacturing a PAB door having the apparatus.

2. Discussion of Related Art

A passenger airbag (PAB) is installed as a safety device in a crash pad panel of a car and, in case of emergency, the passenger airbag (PAB) deploys through a PAB door (or chute). There are various methods for assembling a PAB door depending on a construction method. However, among the method, a structure in which the PAB door is coupled to the rear surface of a crash pad through vibration welding is widely used.

The PAB door includes a main tear portion and a hinge portion. When the PAB door is opened by the expansion of an airbag cushion, the main tear portion is first opened. The hinge portion (i.e., door rotation point) maintains the normal rotation trajectory of the PAB door, thereby preventing the PAB door from being separated from or deviating from a body of the crash pad. Stable airbag deployment performance can be secured only when such a reasonable open action is maintained.

However, due to the intermittent open delay of the main tear portion, a phenomenon that the entire PAB door is lifted up occurs, such that the open time is delayed and thus cracks occur in the surrounding parts including the PAB door. To prevent that, for example, a structure having arbitrary shaped tear inducing ribs are added to the main tear portion inside the PAB door. A distance between the PAB door and the airbag cushion is reduced by the tear inducing ribs. Therefore, the airbag cushion comes into contact with the tear inducing ribs at the beginning of the expansion of the airbag cushion to induce timely tear in the main tear portion.

Figure 1:
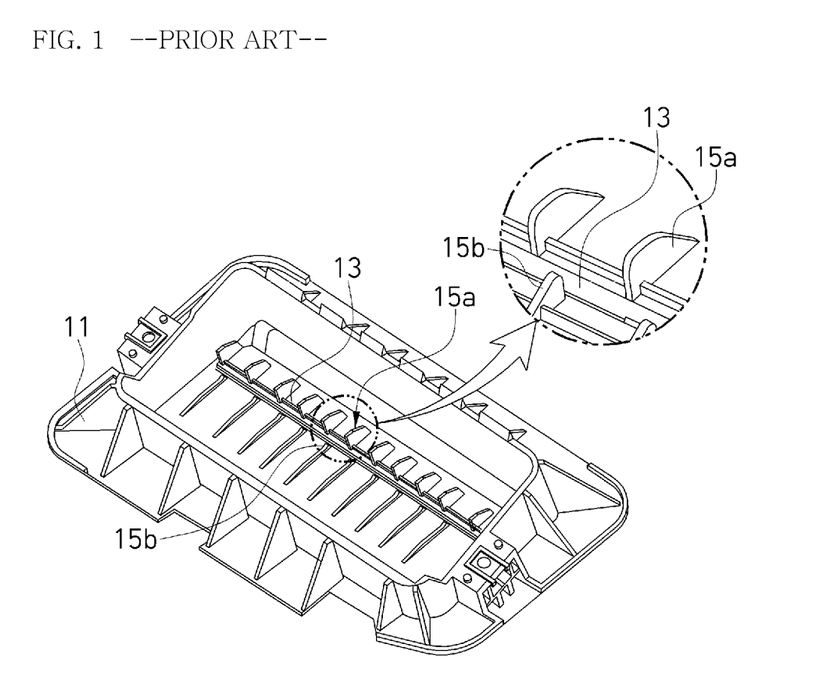
FIG. 1 shows tear inducing ribs according to the related art.

As shown in FIG. 1, the tear inducing ribs are provided as 12 to 14 pairs of ribs 15a and 15b having arbitrary shapes of about 1.8 to 2.0 mm thick, which are arranged to face each other on both sides of a scoring line (or tear line) 13 of the main tear portion on an inner side of a PAB door 11. Referring to the cross-sectional view of FIG. 2, the pair of tear inducing ribs 15a and 15b erected on both sides of the scoring line 13 of the PAB door 11, which is coupled to a crash pad panel 17 through vibration welding, protrude inward and a distance between the PAB door 11 and an airbag cushion 19 is further reduced. Accordingly, when the airbag cushion 19 expands, the airbag cushion 19 comes into contact with the tear inducing ribs 15a and 15b before the scoring line 13, and the airbag cushion 19 is pushed to tear the scoring line 13, thereby solving the problem of the open time delay.

Figure 2:
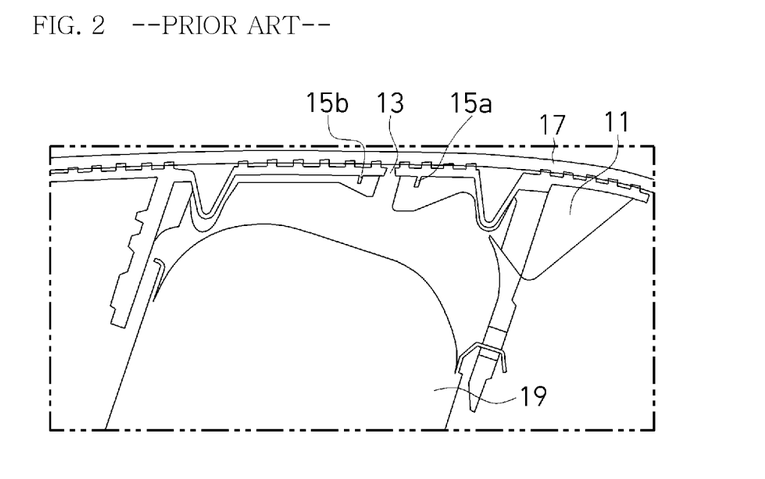
FIG. 2 is a cross-sectional view of FIG. 1.

Side effects occur due to the tear inducing ribs 15a and 15b described above. First, as a plurality of ribs are arranged, an uneven area is wide, and thus the area that a pressing jig for vibration welding can directly press is reduced when coupling the PAB door 11 to the crash pad panel 17 through vibration welding, and thus an adhesive force is reduced. In addition, the airbag cushion may be torn during deployment due to large frictional resistance and interference with the airbag cushion caused by a large number of uneven shapes due to the excessive number and height of the ribs.

In addition, since the conventional tear inducing ribs 15a and 15b need to be formed of a material such as thermoplastic olefin (TPO), which is the material of the PAB door, various types of problems may occur under the conditions of deployment temperature and, furthermore, may damage the airbag cushion, thereby disturbing the normal functions of the airbag. For example, at high temperatures (about 85° C.), the ribs 15a and 15b are crushed and laid down, resulting in degradation of the tear inducing function. At low temperatures (about −35° C.), cracks occur in the ribs 15a and 15b, and as a result, sharp residual edges are generated along with the scattering of debris, which may cause damage (tearing) of the airbag cushion 19, resulting in a fatal loss of function.

The present invention suggests a tear inducing apparatus for a PAB door so as to solve these problems.

SUMMARY OF THE INVENTION

The present invention is directed to a tear inducing apparatus in which a conventional tear inducing apparatus having the shape of ribs is replaced with the shape of pockets so that the contact area is increased so as to stably induce the tear of a scoring line as compared to the case where an airbag cushion locally pushes several conventional thin ribs (having the thickness of 1.8 to 2.0 mm).

That is, the conventional several ribs are combined to form a small number of pockets (e.g., four to five), and the small number of pockets are evenly distributed over the entire length of the PAB door to maintain the balance of tear inducing. In addition, the risk of damage to the cushion is reduced by dispersing frictional resistance concentrated on the airbag cushion rather than sharp ribs, thereby preventing shape deformation and crushing of the tear inducing apparatus during deployment at high temperatures, and eliminating the risk of the occurrence of cracks at low temperatures.

According to an aspect of the present invention, a tear inducing apparatus for a passenger airbag (PAB) door, which is vibration-welded with a crash pad panel, includes: a scoring line disposed on the PAB door and configured to be opened when an airbag cushion deploys, and a plurality of tear inducing pockets (hereinafter, "pockets") disposed on both sides of the scoring line to face each other and arranged in a longitudinal direction of the scoring line. Each of the plurality of pockets includes an empty inner space and a ridge including a flat portion positioned toward the airbag cushion.

According to another aspect of the present invention, a method of manufacturing a passenger airbag (PAB) door to be vibration-welded with a crash pad panel includes: forming a scoring line on the PAB door, in which the scoring line is opened when an airbag cushion deploys, and forming a plurality of pairs of tear inducing pockets (hereinafter, "pockets") disposed on both sides of the scoring line to face each other and arranged in a longitudinal direction of the scoring line. Each of the plurality of pockets includes an empty inner space and a ridge including a flat portion positioned toward the airbag cushion.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or components other than stated elements, steps, operations, and/or components.

Hereinafter, exemplary embodiments of the present invention will be described in detail with reference to the accompanying drawings. In describing the present invention, the detailed description of a related known configuration or function will be omitted when it obscures the gist of the present invention.

Figure 3:
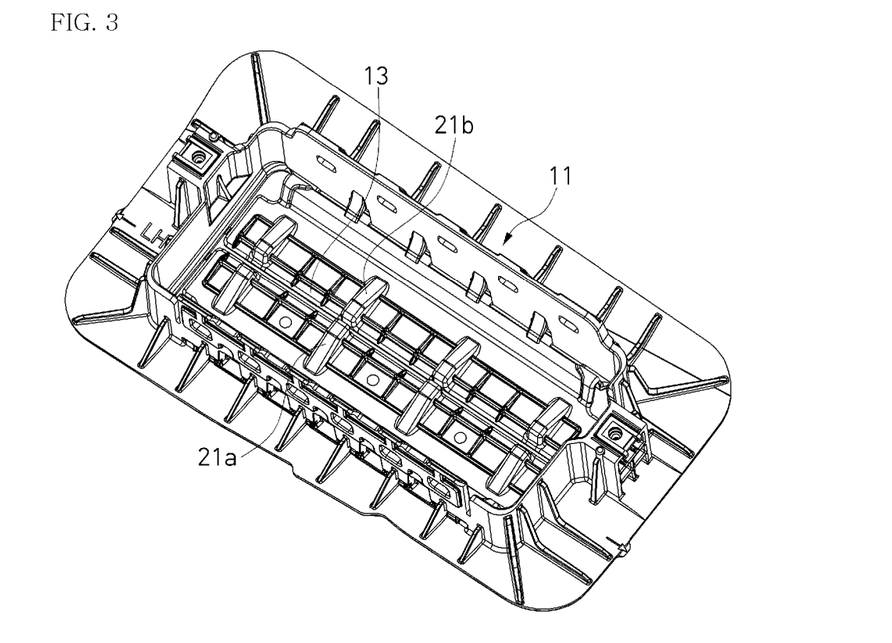
FIG. 3 is a schematic diagram of a tear inducing apparatus according to an embodiment of the present invention.

FIG. 3 is a schematic diagram of an embodiment of a tear inducing apparatus according to the present invention. It shows a state in which a passenger airbag (PAB) door 11 is vibration-welded with a crash pad panel 17. The tear inducing apparatus is configured by replacing tear inducing ribs according to the conventional art with tear inducing pockets 21a and 21b. About ten pairs of ribs according to the conventional art are clustered and reduced to four to five pairs of pockets 21a and 21b, and these pockets 21a and 21b are evenly distributed over the entire width of the PAB door 11 to maintain the balance of tear inducing.

Figure 4:
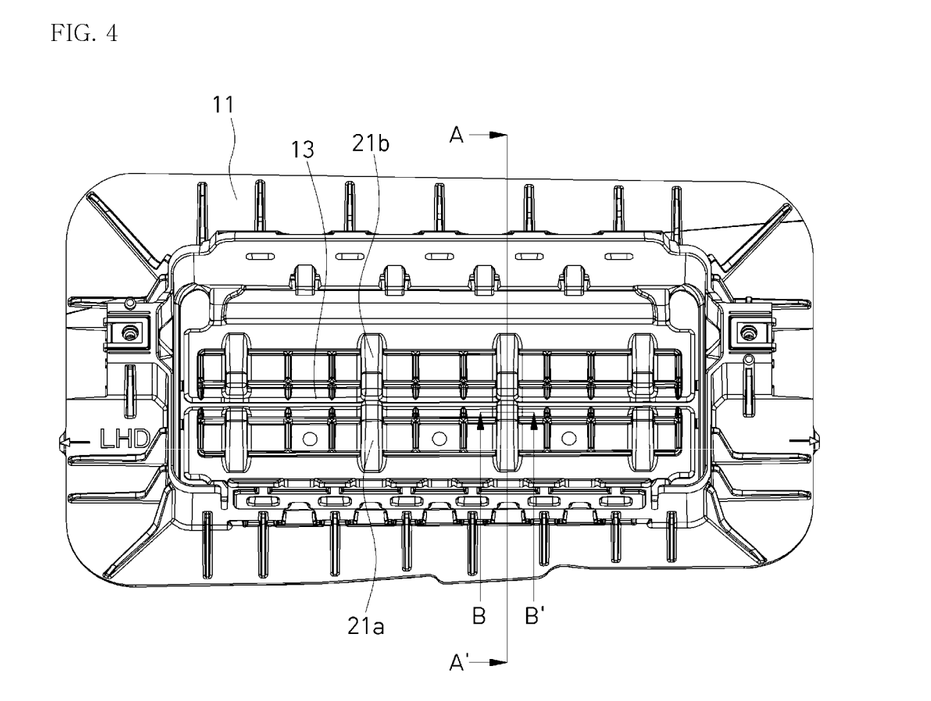
FIG. 4 shows only a passenger airbag (PAB) door (11) of FIG. 3.

FIG. 4 is an inner-side plan view of the PAB door 11. A scoring line or tear line 13 is formed in the center of the PAB door 11, and four pairs of tear inducing pockets 21a and 21b face one another on both sides of the scoring line 13.

Figure 5:
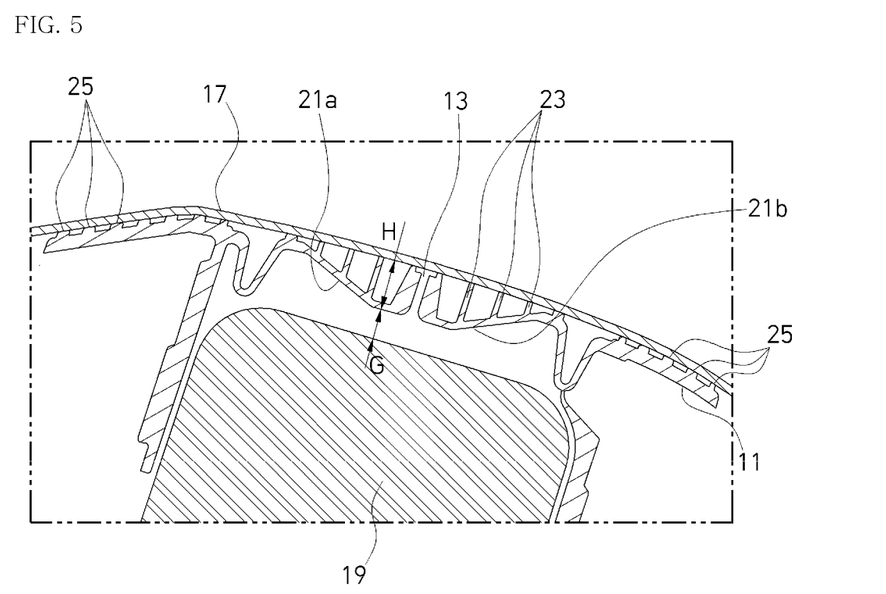
FIG. 5 is a cross-sectional view of the PAB door taken along line A-A of FIG. 4.

FIG. 5 is a cross-sectional view of the PAB door 11 taken along line A-A of FIG. 4. A plurality of welding ribs 25 formed on the outer surface of the PAB door 11 are coupled with the crash pad panel 17 by welding method. In addition, a pair of pockets 21a and 21b, having an approximately right triangle shape, face each other with the scoring line 13 therebetween. The inner space of the pockets 21a and 21b is empty, and several reinforcing ribs 23 are therein provided to reinforce the empty space. These reinforcing ribs 23 are preferably formed integrally with the welding ribs 25 that are originally present to be welded with the crash pad panel 17. An airbag cushion 19 is adjacent to a ridge of each of the pockets 21a and 21b.

In FIG. 5, when it is defined that a distance between the inner bottom surface (base surface) of the PAB door 11 and the ridge of the pockets 21a and 21b is referred to as a "pocket height H", and a gap between the ridge and the airbag cushion 19 is referred to as "G", H is about 14.5 mm and G is about 5 mm. The pocket height H is determined depending on the package conditions (i.e., the size of a PAB assembly) but should not exceed the height of the front/rear hinges of the PAB door 11. In the case of a package in which the foremost line of the airbag cushion 19 is higher than the hinge, H=14.5 mm is ignored and G should be set to maintain a distance of about 5.0 mm.

Figure 6:
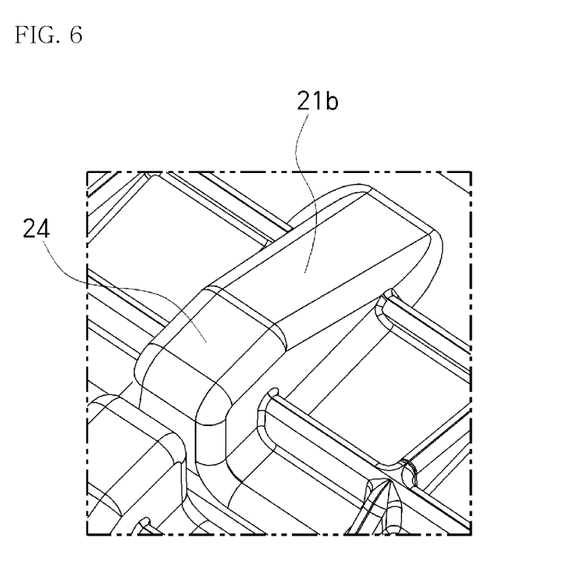
FIG. 6 is a detailed view of one (21b) of tear inducing pockets.

FIG. 6 is a detailed view of one pocket 21b of the tear inducing pockets 21a and 21b. The ridge includes a flat surface 24 with rounded corner. The airbag cushion 19 is designed to come into contact with the flat surface 24 of the ridge so that damage to the airbag cushion 19 can be greatly reduced.

Figure 7:
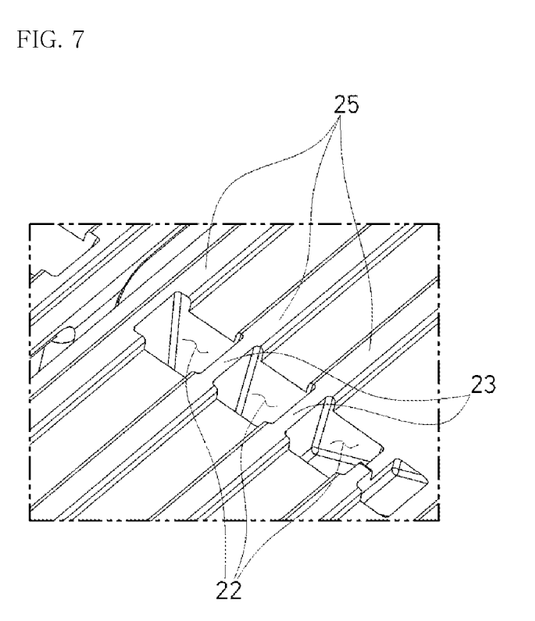
FIG. 7 shows the opposite side of the pocket shown in FIG. 6.

FIG. 7 shows the opposite side of the pocket of FIG. 6. As described above, it can be seen that the pocket has a hollow shape with an empty space 22 formed therein. The reinforcing ribs 23 pass through the empty space 22 of the pocket on the bottom surface integrally with the original welding ribs 25 (see FIG. 5). That is, the reinforcing ribs 23 are integrally formed with the welding ribs 25 (ribs that are welded by coming in contact with the crash pad panel 17 during vibration welding) that are originally present on the outer surface of the PAB door 11 and are integrally formed with the PAB door 11 to pass through the outer surface of the crash pad panel 17 without interruption so that there is no degradation of adhesive force after vibration welding with the crash pad panel 17. Also, these welding ribs 25 maintain a supportive force so that cracks do not occur in the pockets 21a and 21b during a process of deployment of the airbag cushion 19. In FIG. 7, it is expressed that the thickness of each of the reinforcing ribs 23 is smaller than that of the welding ribs 25. According to the design, the thickness of each of the reinforcing ribs 23 may be about 1.5 mm, which may be about 50% of the thickness (about 3.0 mm) of each of the welding ribs 25.

Figure 8:
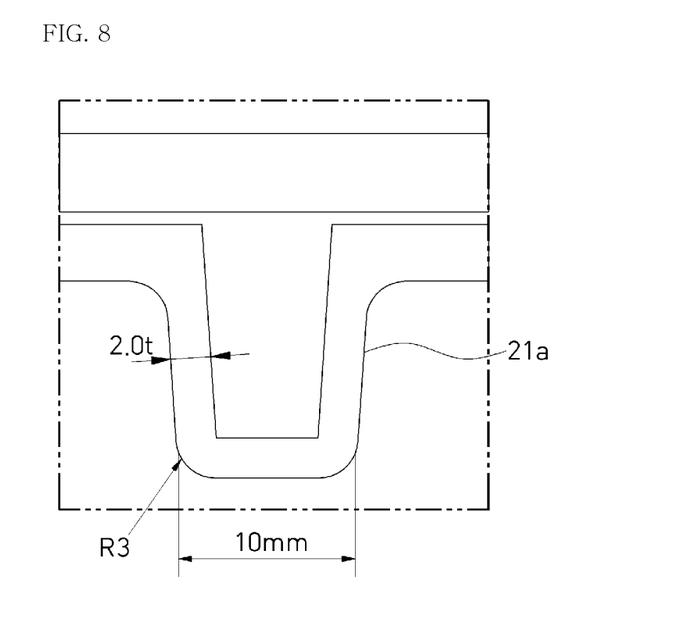
FIG. 8 is a cross-sectional view of the PAB door taken along line B-B of FIG. 4.

FIG. 8 is a cross-sectional view of the PAB door 11 taken along line B-B of FIG. 4. Looking at the illustrated dimensions, the distance (width) between the outer walls of the pocket 21a or 21b is about 10 mm, and the thickness of each wall is about 2.0 mm. Also, the curvature radius R of an outer corner of each of the pockets 21a and 21b is about 3 mm or more (see also FIGS. 11 and 13). In this way, the corners of the ridge of the pocket 21a or 21b are rounded to prevent damage to the cushion when the airbag cushion 19 deploys.

Figure 9:
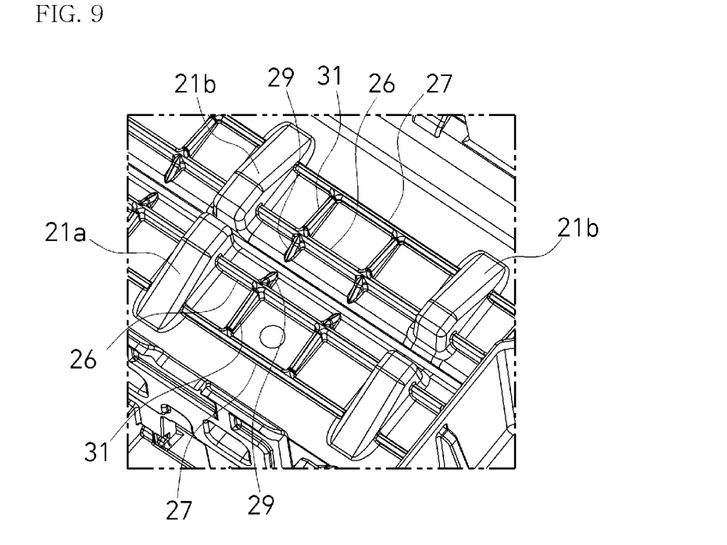
FIG. 9 shows a structure between neighboring pockets.

FIG. 9 shows a structure between neighboring pockets. Lengthwise ribs 26 and 27 are connected between the pockets 21a and 21b and neighboring pockets 21a and 21b so as to prevent the PAB door 11 from being bent like a bow when the airbag deploys. The lengthwise ribs 26 and 27 include a relatively high first lengthwise rib 26 located under the ridge portion of the pockets 21a and 21b, and a relatively low second lengthwise rib 27 located under the narrow wall portion of the pockets 21a and 21b.

According to an actual design, heights of the lengthwise ribs 26 and 27 (i.e., the altitude from the inner bottom (base surface) of the PAB door 11) may respectively be 5.0 mm or less and 2.0 mm or less, each of which is lower than the height of the pocket. In particular, preferably, rounding treatment of R1.0 is performed on heads of the lengthwise ribs 26 and 27 to relieve frictional resistance when the airbag cushion 19 deploys. In addition, preferably, the positions of the lengthwise ribs 26 and 27 are not collinear with the welding ribs 25 (more preferably, the lengthwise ribs 26 and 27 are positioned to intersect the welding ribs 25). The reason is to prevent a sink mark and to ensure that the pressing force of a pressing jig for welding is evenly distributed during vibration welding with the crash pad panel 17.

Also, a first breadthwise rib 31 having triangular shapes is connected between the first lengthwise rib 26 and the second lengthwise rib 27, and a second breadthwise rib 29 having triangular shapes is connected between the first lengthwise rib 26 and the base surface (inner bottom surface) of the PAB door 11. For the purpose thereof, preferably, these breadthwise ribs 31 and 29 are connected to the height of the lengthwise ribs 26 and 27 without a step height. That is, the maximum height (altitude) of the hypotenuse of the first breadthwise rib 31 is the same as the height of the first lengthwise rib 26, and the minimum height thereof is the same as the height of the second lengthwise rib 27. In addition, the maximum height of the hypotenuse of the second breadthwise rib 29 is the same as the height of the first lengthwise rib 26, and the minimum height thereof is the same as the base surface (inner bottom surface) of the PAB door 11 and thus is formed to be almost zero.

By using these first breadthwise rib 31 and second breadthwise rib 29, the lengthwise ribs 26 and 27 are reinforced to prevent cracks; and an uneven shape, in which frictional resistance can be generated when the airbag cushion 19 deploys, is concealed in the pocket and thus, the airbag cushion 19 can deploy more smoothly.

Figure 10:
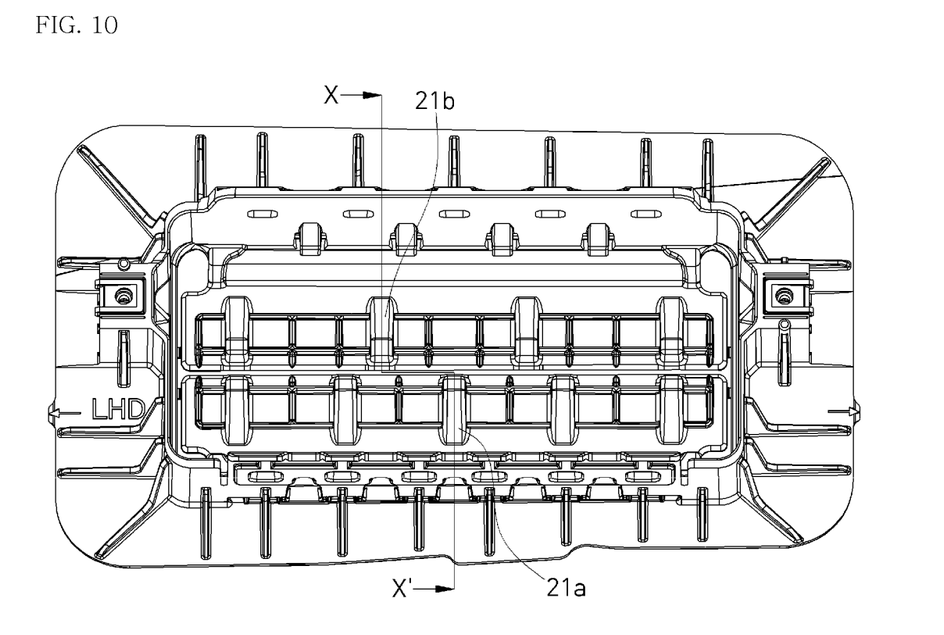
FIGS. 10 and 12 illustrate two different examples of the shape of pockets (21a and 21b)
Figure 11:
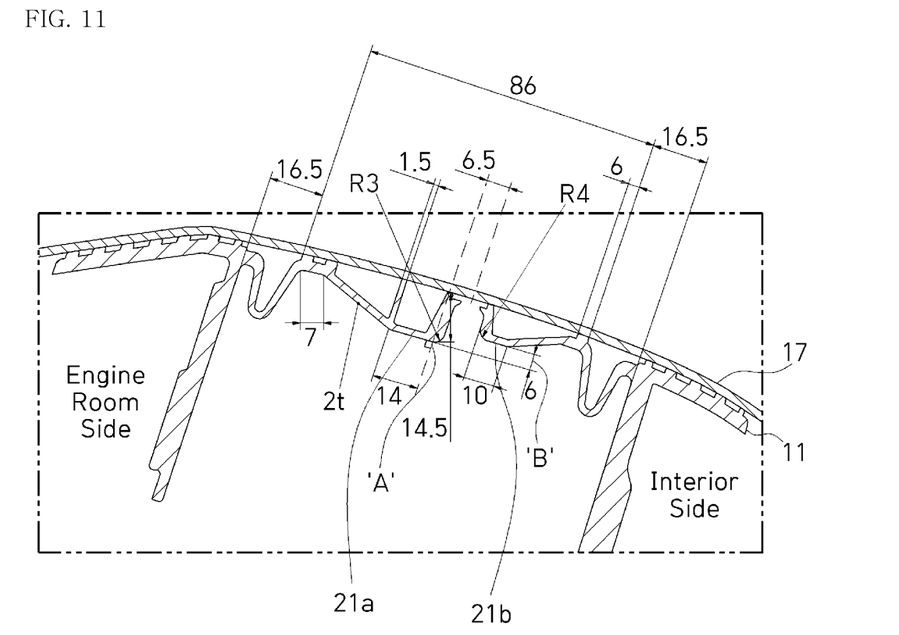
FIG. 11 is a cross-sectional view of the pockets taken along line X-X of FIG. 10.
Figure 12:
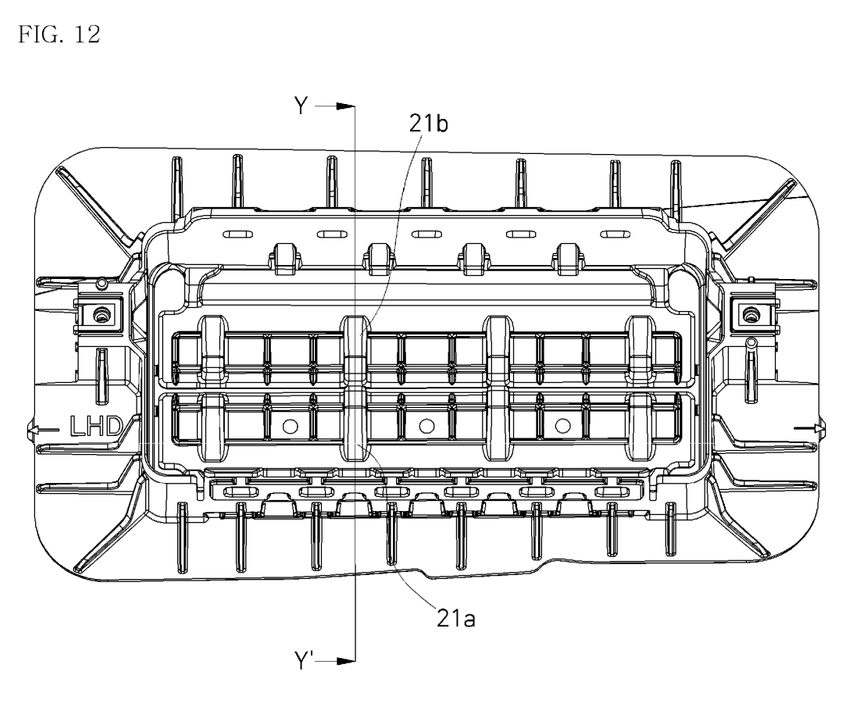
Figure 13:
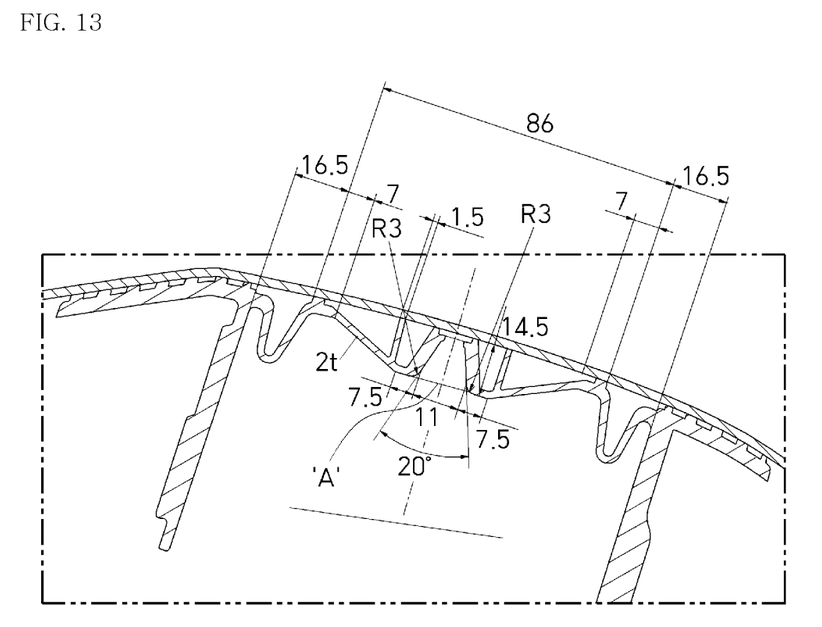
FIG. 13 is a cross-sectional view of the pockets taken along line Y-Y of FIG. 12.

FIGS. 10 to 13 illustrate two examples of the shape of the pockets 21a and 21b. FIG. 10 illustrates an example in which the sizes of the pockets 21a and 21b facing each other are different from each other and the pockets 21a and 21b face each other in a position where the pockets 21a and 21b are shifted by a distance of approximately 6:4. FIG. 12 shows an example in which the sizes of the pockets 21a and 21b facing each other are the same and the pockets 21a and 21b face each other in the same position. FIG. 11 is a cross-sectional view taken along line X-X of FIG. 10, and FIG. 13 is a cross-sectional view taken along line Y-Y of FIG. 12.

In FIG. 11, the dimensions of the larger pocket 21a in the shifted position are illustrated, and cross-sectional structures of the pockets 21a and 21b are shown. In FIG. 11, the corner curvature of the flat portion of the ridge of the pocket 21a is R=3, and the corner curvature of the flat portion of the ridge of the pocket 21b is R=4, which are different from each other. Also, "A" means an angle that the flat surface 24 (see FIG. 6) of the ridge of the pocket 21a on the engine compartment side is set to normal (90°) at a deployment direction of the airbag cushion 19. The reason for the normal setting is that that point is a contact surface that the airbag cushion 19 comes in contact with and pushes out. In addition, "B" means that the difference between the height of the pocket 21a on the engine compartment side and the height of the pocket 21b on the interior side is about 6.0 mm and the height of the pocket 21b on the interior side is set to be smaller than the pocket 21a on the engine compartment side. The reason is that the example of FIG. 10 is an example in which the width of the PAB door 11 is relatively small, and in this case, the deployment resistance of the cushion is higher.

FIG. 13 shows that the pocket 21a on the engine compartment side and the pocket 21b on the interior side have the same shape and dimensions. Even in this case, like "A" of FIG. 11, the flat surface 24 of the ridge of the pocket 21a on the engine room side is set to normal (90°) at the deployment direction of the airbag cushion 19.

Figure 14:
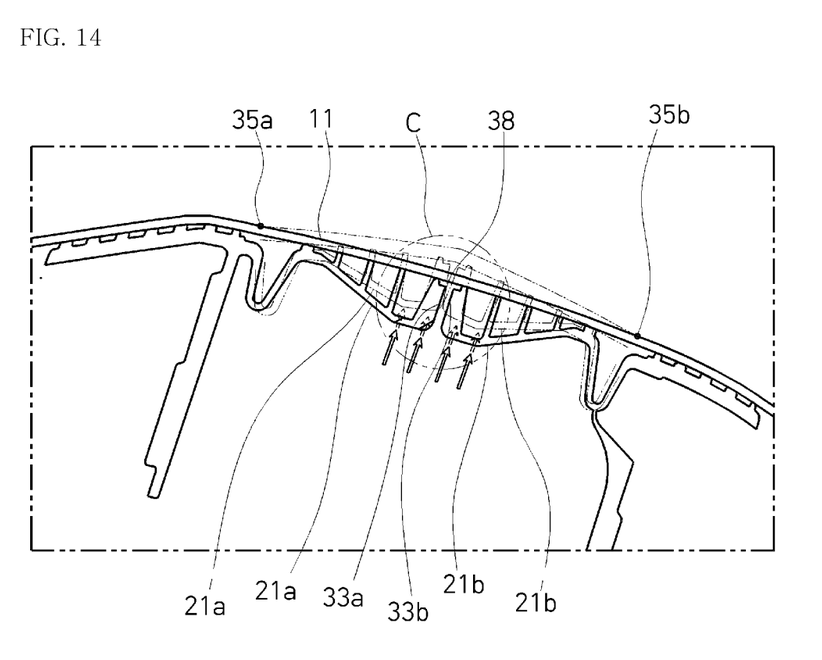
FIG. 14 illustrates a further embodiment of the present invention.
Figure 15:
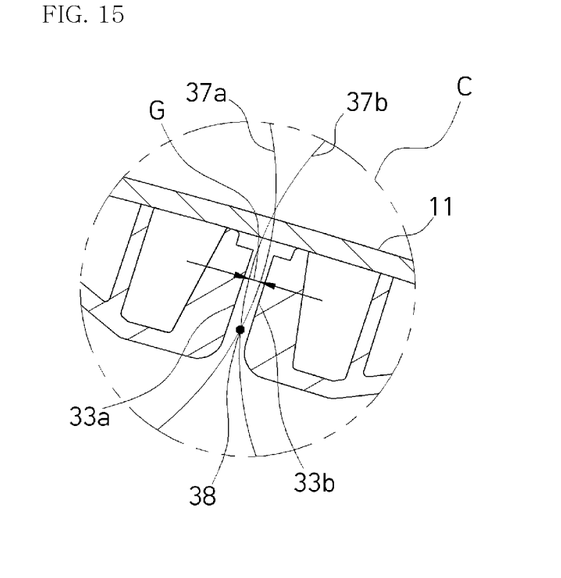
FIG. 15 is an enlarged view of C in FIG. 14.

FIGS. 14 and 15 illustrate a further embodiment for maximizing early tearing (opening) by the pockets of the present invention upon tearing of the PAB door by airbag cushion expansion.

In this embodiment, both facing pockets 21a and 21b are pushed by the inflation force of the airbag cushion (in the direction of the arrows), so that both portions of the PAB door 11 about the scoring line rotate around the door rotation points (i.e., the hinge portion) 35a and 35b, respectively. The dimensions of the pockets are intentionally designed to be large so that facing surfaces 33a and 33b of both pockets 21a and 21b are docked (contacted) with each other when in initial open.

In FIG. 15, the docking point of the pockets' facing surfaces 33a and 33b are indicated by "38". The docking point will be described through an enlarged view of part C of FIG. 14. As shown in FIG. 15, when the door 11 is opened while the pockets 21a and 21b are pushed by the airbag cushion, they draw rotation trajectories 37a and 37b. On the rotation trajectories 37a and 37b, the dimensions of the pockets 21a and 21b are set so that the facing surfaces 33a and 33b overlap each other in the size of G (for example, 0.8 mm).

In this way, when in door's initial open, a concentrated tensile force is additionally induced on the scoring line formed in the PAB door 11, by virtue of the docking by the overlap design of the pocket facing surfaces 33a and 33b. That is, the docking point is leveraged as a support point at the time of docking the pockets, and an additional tensile force is generated in the scoring line of the door in both directions, and accordingly, early tearing of the scoring line is made smoothly, so that the early tearing time can be secured and the tearing stability can be achieved.

According to the present invention, the frictional resistance applied to a cushion when the airbag cushion deploys is reduced compared to the related art so that the risk of damage to the cushion can be eliminated, and scattering caused by cracks in a door during the deployment is eliminated so that secondary injury to passengers can be reduced.

In addition, many ribs of an existing PAB door are integrated to configure a tear inducing ribs in the shape of a few (e.g., four or five) pockets so that the pressure loss of a welding jig in the process of coupling the door to a crash pad panel through vibration welding can be minimized and thus the quality of welding can be stabilized.

Although the present invention has been described in detail above with reference to the exemplary embodiments, those of ordinary skill in the technical field to which the present invention pertains should be able to understand that various modifications and alterations can be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. A tear inducing apparatus for a passenger airbag (PAB) door, the PAB door being vibration-welded with a crash pad panel, wherein the tear inducing apparatus comprises:
    a scoring line disposed on the PAB door and configured to be opened when an airbag cushion deploys; and
    a plurality of tear inducing pockets disposed on both sides of the scoring line to face each other and arranged in a longitudinal direction of the scoring line,
    wherein each of the plurality of pockets comprises an inner space and a ridge including a flat portion facing toward the airbag cushion,
    wherein each of the plurality of pockets further comprises two opposing side walls and a facing surface such that the inner space is defined and surrounded by the ridge, the two opposing side walls, and the facing surface,
    wherein, in the longitudinal direction of the scoring line, the side walls facing each other between neighboring pockets among the plurality of pockets are spaced apart from each other, and
    wherein, in a cross-sectional view of the neighboring pockets, cut across the flat portions of the neighboring pockets in the longitudinal direction of the scoring line, a recessed portion is formed between the flat portions of the neighboring pockets.

2. The tear inducing apparatus for the PAB door of claim 1, wherein the plurality of pockets includes a pair of facing pockets, which comprise one pocket on each side of the scoring line and nearest to each other among the plurality of pockets, at least one of a shape or a size of the pair of facing pockets among the plurality of pockets is the same as each other, and the pair of facing pockets are disposed in a same position as each other in the longitudinal direction.

3. The tear inducing apparatus for the PAB door of claim 1, wherein the inner space of each of the plurality of pockets comprises a reinforcing rib.

4. The tear inducing apparatus for the PAB door of claim 3, wherein the reinforcing rib is formed integrally with a welding rib welded with the crash pad panel of the PAB door.

5. The tear inducing apparatus for the PAB door of claim 3, wherein the inner space of each of the plurality of pockets further comprises another reinforcing rib, and heights of the reinforcing rib and the other reinforcing rib are different from each other.

6. The tear inducing apparatus for the PAB door of claim 1, wherein a gap between the ridge of one pocket, among the plurality of pockets, and the airbag cushion is 5 mm.

7. The tear inducing apparatus for the PAB door of claim 1, further comprising:
    at least one lengthwise rib extending between neighboring pockets and connecting the neighboring pockets to each other so as to prevent the PAB door from being bent when the airbag cushion deploys.

8. The tear inducing apparatus for the PAB door of claim 7, wherein a head of the at least one lengthwise rib is rounded.

9. The tear inducing apparatus for the PAB door of claim 7, wherein the at least one lengthwise rib is located not to be collinear with a welding rib welded with the crash pad panel of the PAB door.

10. The tear inducing apparatus for the PAB door of claim 7, wherein the at least one lengthwise rib comprises a first lengthwise rib located in a first position of the neighboring pockets and a second lengthwise rib located in a second position of the neighboring pockets,
    wherein a height of the first lengthwise rib is larger than a height of the second lengthwise rib.

11. The tear inducing apparatus for the PAB door of claim 10, further comprising a first breadthwise rib connecting the first lengthwise rib and the second lengthwise rib to each other, the second lengthwise rib being disposed between the first lengthwise rib and a base surface of the PAB door.

12. The tear inducing apparatus for the PAB door of claim 1, wherein the plurality of pockets includes a pair of facing pockets, which comprise one pocket on each side of the scoring line and nearest to each other among the plurality of pockets, each of the pair of facing pockets comprising the facing surface,
    wherein the facing surface of a first pocket faces the facing surface of a second pocket, among the pair of facing pockets, and
    wherein dimensions of the first and second pockets are configured such that the facing surfaces overlap each other on rotation trajectories drawn by the facing surfaces when the PAB door is opened while the first and second pockets are pushed by the airbag cushion.

13. A tear inducing apparatus for a passenger airbag (PAB) door, the PAB door being vibration-welded with a crash pad panel, wherein the tear inducing apparatus comprises:
    a scoring line disposed on the PAB door and configured to be opened when an airbag cushion deploys; and
    a plurality of tear inducing pockets disposed on both sides of the scoring line to face each other and arranged in a longitudinal direction of the scoring line,
    wherein each of the plurality of pockets comprises an inner space and a ridge including a flat portion facing toward the airbag cushion, and
    wherein the plurality of pockets includes a pair of facing pockets, which comprise one pocket on each side of the scoring line and nearest to each other among the plurality of pockets, at least one of a shape or a size of the pair of facing pockets among the plurality of pockets is different from each other, and the pair of facing pockets are disposed in different positions from each other in the longitudinal direction.

14. The tear inducing apparatus for the PAB door of claim 13, wherein a corner curvature of the flat portion of the ridge of a first pocket of the pair of facing pockets and a corner curvature of the flat portion of the ridge of a second pocket of the pair of facing pockets are different from each other.

15. A method of manufacturing a passenger airbag (PAB) door to be vibration-welded with a crash pad panel, the method comprising:
    forming a scoring line on the PAB door, the scoring line being opened when an airbag cushion deploys; and
    forming a plurality of tear inducing pockets disposed on both sides of the scoring line to face each other and arranged in a longitudinal direction of the scoring line,
    wherein each of the plurality of pockets comprises an inner space and a ridge including a flat portion facing toward the airbag cushion,
    wherein each of the plurality of pockets further comprises two opposing side walls and a facing surface such that the inner space is defined and surrounded by the ridge, the two opposing side walls, and the facing surface,
    wherein, in the longitudinal direction of the scoring line, the side walls facing each other between neighboring pockets among the plurality of pockets are spaced apart from each other, and
    wherein, in a cross-sectional view of the neighboring pockets, cut across the flat portions of the neighboring pockets in the longitudinal direction of the scoring line, a recessed portion is formed between the flat portions of the neighboring pockets.

16. The method of claim 15, further comprising forming a reinforcing rib in the inner space of each of the plurality of pockets.

17. The method of claim 15, further comprising forming at least one lengthwise rib extending between the neighboring pockets and connecting the neighboring pockets to each other so as to prevent the PAB door from being bent when the airbag cushion deploys.

18. The method of claim 17, wherein the at least one lengthwise rib comprises a first lengthwise rib located in a first position of the neighboring pockets and a second lengthwise rib located in a second position of the neighboring pockets.

19. The method of claim 18, further comprising
    forming a breadthwise rib connecting neighboring lengthwise ribs to each other.

20. The method of claim 15, wherein the plurality of pockets includes a pair of facing pockets, which comprise one pocket on each side of the scoring line and nearest to each other among the plurality of pockets, each of the pair of facing pockets comprising the facing surface,
    wherein the facing surface of a first pocket faces the facing surface of a second pocket, among the pair of facing pockets, and
    wherein dimensions of the first and second pockets are configured such that the facing surfaces overlap each other on rotation trajectories drawn by the facing surfaces when the PAB door is opened while the first and second pockets are pushed by the airbag cushion.

* * * * *